(12) United States Patent
Loukianov

(10) Patent No.: US 7,545,794 B2
(45) Date of Patent: Jun. 9, 2009

(54) TIMESTAMPING NETWORK CONTROLLER FOR STREAMING MEDIA APPLICATIONS

(75) Inventor: Dmitrii Loukianov, Chadler, AZ (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 10/642,469

(22) Filed: Aug. 14, 2003

(65) Prior Publication Data

US 2005/0036512 A1    Feb. 17, 2005

(51) Int. Cl.
*H04J 3/06* (2006.01)
(52) U.S. Cl. .................................. 370/350; 370/503
(58) Field of Classification Search ............... 370/350, 370/503, 507, 509, 510, 511, 518, 252, 253, 370/516
See application file for complete search history.

(56) References Cited

U.S. PATENT DOCUMENTS

| | | | | |
|---|---|---|---|---|
| 5,537,408 A | * | 7/1996 | Branstad et al. | 370/473 |
| 5,640,388 A | * | 6/1997 | Woodhead et al. | 370/468 |
| 5,850,386 A | * | 12/1998 | Anderson et al. | 370/241 |
| 5,966,387 A | * | 10/1999 | Cloutier | 370/516 |
| 5,995,570 A | * | 11/1999 | Onvural et al. | 375/356 |
| 6,259,694 B1 | * | 7/2001 | Sato et al. | 370/389 |
| 6,687,752 B1 | * | 2/2004 | Falco et al. | 709/230 |
| 6,728,241 B2 | * | 4/2004 | Hakkarainen et al. | 370/389 |
| 7,206,327 B2 | * | 4/2007 | Lorek et al. | 370/503 |
| 2005/0002402 A1 | * | 1/2005 | Fairman | 370/395.5 |
| 2005/0036763 A1 | * | 2/2005 | Kato et al. | 386/69 |
| 2005/0237937 A1 | * | 10/2005 | Van Gestel | 370/235 |

\* cited by examiner

*Primary Examiner*—Ricky Ngo
*Assistant Examiner*—Gary Mui
(74) *Attorney, Agent, or Firm*—Blakely, Sokoloff, Taylor & Zafman LLP

(57) ABSTRACT

A system and method of end-to-end clock recovery for media streaming. The method including inspecting a data packet sent by an application to determine a protocol type of the data packet and a location of a timestamp field in the data packet. If the data packet matches a pre-determined protocol type, a new timestamp is generated and inserted into the timestamp field of the packet in real-time in place of an original, possibly less reliable timestamp. The new timestamp accurately defines the time of transmission of the data packet. The data packet is transmitted over a network to a receiver. A receiver receiving the data packet, inspects the received data packet to determine whether the received data packet matches an identification criterion. If the received data packet matches the identification criterion, the receiver generates a local timestamp in real-time and processes the local timestamp and the new timestamp from the received packet to determine an error signal. The error signal is used to adjust the local clock within the receiver.

44 Claims, 8 Drawing Sheets

TIMESTAMPING NETWORK CONTROLLER FOR STREAMING MEDIA APPLICATIONS

FIELD OF THE INVENTION

The present invention is generally related to the field of digital signal processing. More particularly, the present invention is related to a system and method for clock recovery in media streaming.

DESCRIPTION

An application common in computing devices, such as, but not limited to, personal computers (PCs), is the ability to process streaming audio/video (A/V) content from a network for real-time playback. For example, in a digital home entertainment system, which includes a set-top box (such as a media center) and various rendering clients (such as a PC, a personal digital assistant (PDA), a television, etc.), a network connection to the set-top box may carry live audio and video streams from service providers, such as cable and satellite service providers. The rate at which live audio and video streams are created should be the same rate at which the live audio and video stream is consumed at the rendering client. For example, 1 Mbyte of data created in one minute of a live football broadcast, sent via a cable or satellite provider, should be consumed by the rendering client at the same rate (i.e., 1 Mbyte in one minute).

In order to correctly decode the live audio and video (A/V) stream, the rendering client must reconstruct the source (i.e., transmitter) program clock at the receiver from the information carried in the live A/V stream. For MPEG (Motion Picture Expert Group) compliance, the accuracy of the recovered clock should be below 30 ppm from the source program clock at any time.

In conventional MPEG broadcast systems, the delay for every byte of data in the communication channel is constant. Thus, reconstruction of the source program clock is accomplished using a local clock recovery circuit, which is implemented as a frequency-controlled oscillator with a feedback loop adjusting the frequency based on received timestamps (see MPEG 2 Standard, ISO/IEC International Standard 13818 (November 1994)). When wired or wireless packet-based networks are used to carry MPEG A/V streams, the delay is no longer constant for all bytes in the A/V stream. Delays in wired or wireless packet-based networks originate from bursty traffic, retransmissions and buffering in network adapters and intermediate nodes, thus resulting in jitter. In this situation, the data in the timestamps does not necessarily correspond to their arrival time, and a traditional timing recovery solution may not work to keep the destination and source clocks in synchronization.

Thus, what is needed is a system and method for enabling a destination and a source clock to be in synchronization (locked) when wired or wireless packet-based networks are used to carry MPEG A/V data streams.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are directed to a system and method for clock recovery in media streaming. This is accomplished by updating timestamps at the media access controller (MAC) level on the transmitter side and accurately timestamping the received packet on the receiver side to eliminate dependency on the intrinsic delays in the software, data buffers, and MAC, and re-timestamp the packets immediately when they are transmitted to the physical medium and received from the physical medium. Although embodiments of the present invention are described with respect to Real-Time Protocol (RTP) for Internet Protocol (IP) networks, other types of network protocols that can carry real-time traffic may also be used.

Figure 1:
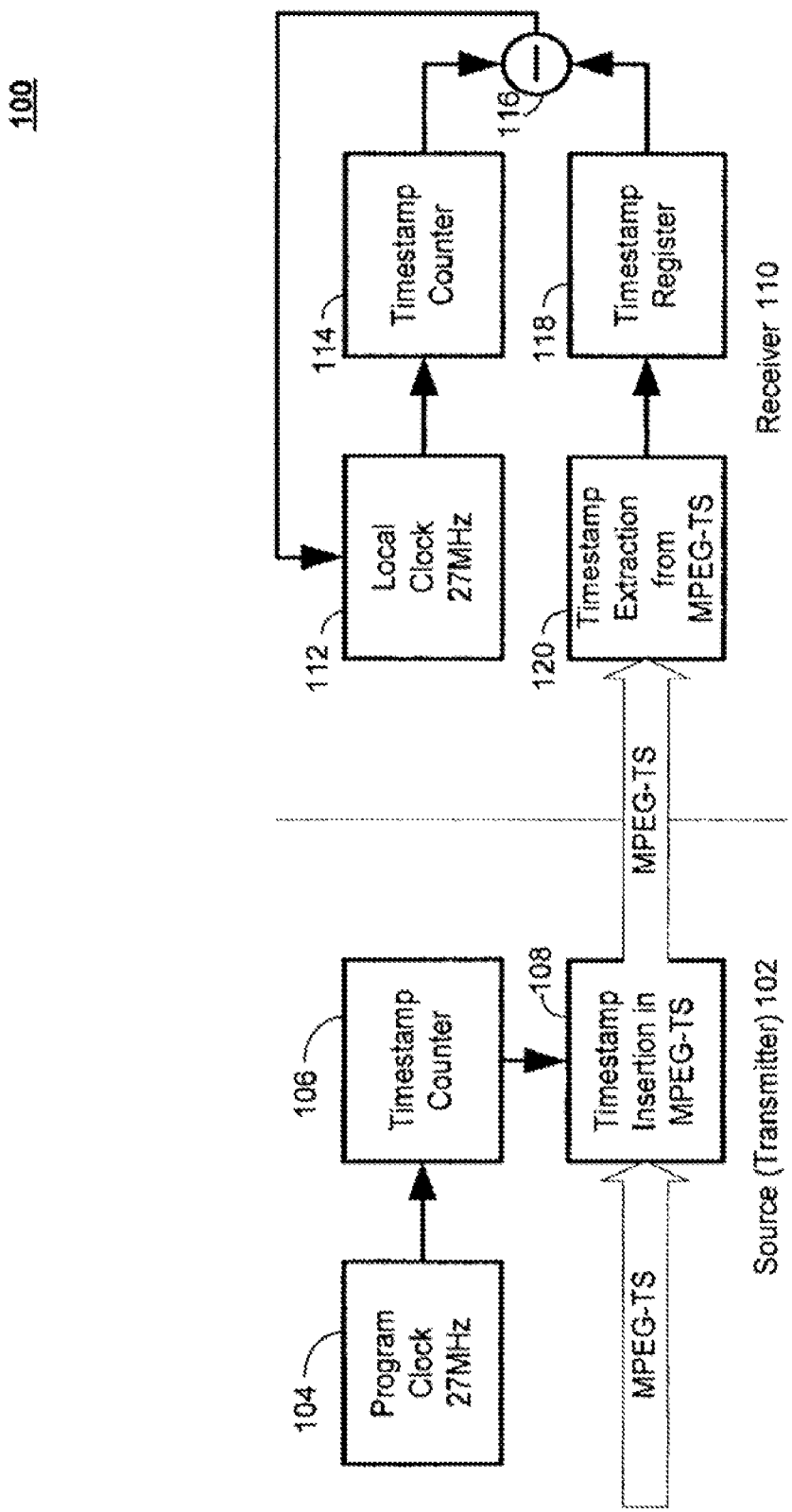
FIG. 1 is a simplified block diagram illustrating exemplary conventional transmit and receive network adapters for keeping source and destination clocks in synchronization when decoding MPEG transport streams.

FIG. 1 is a simplified block diagram illustrating exemplary conventional transmit and receive network adapters for keeping source and destination clocks in synchronization when decoding MPEG transport streams. The conventional transmit and receive adapters work well with a conventional MPEG broadcast system in which the delay for every byte in the communication channel is constant. FIG. 1 shows a transmitter 102 and a receiver 110.

Transmitter 102 comprises a program clock 104, a timestamp counter 106, and a timestamp insertion circuit 108. Program clock 104 is coupled to timestamp counter 106 and timestamp counter 106 is coupled to timestamp insertion circuit 108.

A clock generator (not shown) is synchronized with program clock 104. In the case of an MPEG transport stream, program clock 104 is a 27 MHz reference clock. Timestamp counter 106 is used to count the clock ticks of program clock 104. Timestamp insertion circuit 108 receives an MPEG transport stream and inserts timestamp data (i.e., program clock reference data) from timestamp counter 106 that corresponds to the actual time of program clock 104 when the MPEG transport stream leaves transmitter 102.

Receiver 110 comprises a local clock 112, a receiver timestamp counter 114, a subtractor 116, a timestamp register 118, and a timestamp extraction circuit 120. Local clock 112 is coupled to receiver timestamp counter 114 and to subtractor 116. Receive timestamp counter 114 is coupled to subtractor 116. Timestamp register 118 is coupled to subtractor 116. Timestamp extraction circuit 120 is coupled to timestamp register 118.

Timestamp extraction circuit 120 receives the MPEG transport stream transmitted by transmitter 102 and extracts the timestamp from the MPEG transport stream. The extracted (i.e., received) timestamp is stored in timestamp register 118. Local clock 112 is implemented as a frequency-controlled oscillator. Receiver timestamp counter 114, subtractor 116, and timestamp register 118 together comprise an automatic frequency control loop. When the timestamp is extracted from the incoming MPEG transport stream, local clock 112 is also timestamped as a local timestamp using receiver timestamp counter 114. The difference between the received timestamp and the local timestamp is obtained via subtractor 116 and provides a feedback signal that adjusts the frequency of local clock 112. In an ideal system, the frequency of local clock 112 eventually converges to the frequency of transmitter program clock 104 to enable both clocks to run synchronously.

The recovered program clock reference timestamp is usually the source of video synchronization signals, PAL/NTSC (Phase Alternation by Line/National Television Standards Committee) color bursts, and audio clocks. Jitter from the recovered program clock reference timestamp may have dramatic video and audio effects. With respect to audio, jitter translates into excess noise and may result in audible pitch variation. With respect to video, jitter may cause jagged vertical lines and potential loss of color synchronization. Although it is possible to conceal these effects by buffering data, buffer underruns or overruns will occur sooner or later if the clocks are out of synchronization. For example, if the source and destination clocks differ by 100 ppm (typical computer grade crystal accuracy), and the data rate is 3 Mbytes/s (HDTV (High Definition Television) MPEG stream), the buffer will grow or deplete at a rate of 0.3 Kbytes/s. In one hour, the buffer will grow by approximately 1 Mbyte. For consumer quality audio/video equipment, where the viewer expects to be able to view uncorrupted pictures for a long period of time, it is not desirable to drop video frames or audio samples as a corrective measure to keep the buffer size within reasonable limits.

When wired or wireless packet-based networks are used to carry MPEG transport streams, the delay is no longer constant for all bytes in the transport stream. Therefore, transmitter 102 and receiver 110 may not work to keep the destination and source clocks in synchronization (locked). The delays in the packet-based networks may originate from bursty traffic, retransmissions due to collisions in the channel, and buffering in the network adapters and intermediate nodes, thus resulting in jitter. For example, a packet containing a timestamp may be buffered and a router may be immediately available. In this instance, the packet will be sent with a very short delay. Alternatively, a packet containing a timestamp may be buffered, and there may be a long queue of packets at the router node. In this instance, the packet, which will be at the tail end of the queue, will experience a long delay. When the packet with the timestamp is received at its destination, the timestamp will no longer indicate an accurate time at which the packet was transmitted because of the long delays experienced by the packet prior to transmission. In other words, since the generation of the timestamp occurred prior to the packet experiencing the delays, the delays, which are unknown, could not be accounted for in the timestamp. Therefore, the timestamp is no longer accurate, and thus, the frequency recovery circuit is no longer accurate as well.

Figure 2:
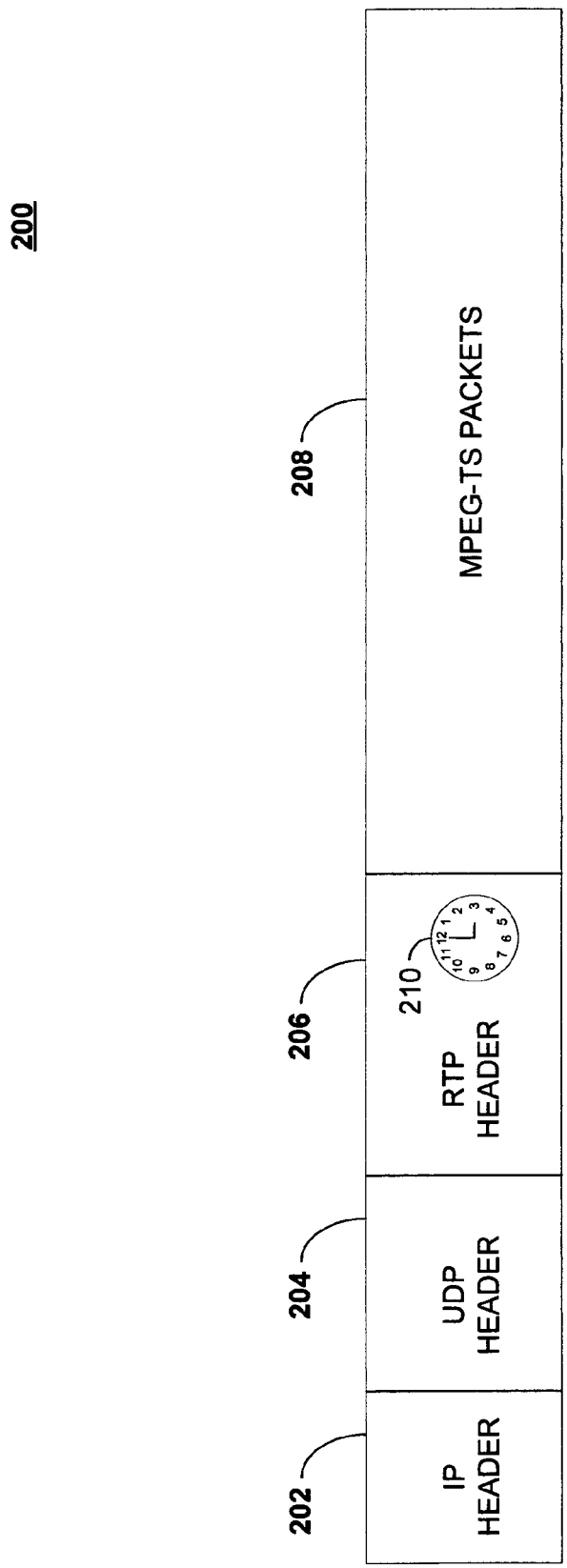
FIG. 2 is a diagram illustrating a structure of an exemplary Real-Time Protocol (RTP) packet for a MPEG audio/video transport stream.

Several network protocols may carry real-time traffic, such as, for example, Real-Time Protocol (RTP) for Internet Protocol (IP) networks. RTP may be used as a transport with other traffic control protocols, such as Real Time Conferencing Protocol (RTCP), Real Time Streaming Protocol (RTSP), Standard Interface Protocol (SIP), etc., for multimedia streaming applications. RTP is also used in Digital Video Broadcasting-Internet Protocol Initiative (DVB-IPI) and Digital Video Broadcasting-Multimedia Home Platform (DVB-MHP) infrastructures for in-home media distribution. A structure of an exemplary RTP packet 200 for MPEG audio/video transport streams is shown in FIG. 2. RTP packet 200 comprises an IP header 202, a User Datagram Protocol (UDP) header 204, a RTP header 206, and a plurality of MPEG transport stream packets 208 as a payload. As shown in FIG. 2, RTP header 206 includes a timestamp 210 of a reference time base that indicates when the packet is supposed to be received. This header was created by the network stack and does not account for the delays that may happen in the network buffers, routers, and physical media. Embodiments of the present invention may use this timestamp as a placeholder to correct for unknown delay or jitter in a de-jittering device.

Figure 3C:
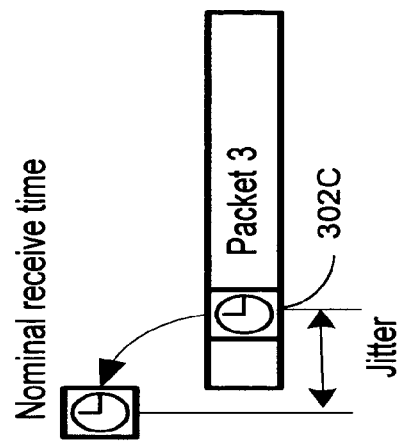
FIGS. 3A-3C are exemplary diagrams illustrating various delays experienced by data packets in packet-based networks.
Figure 3B:
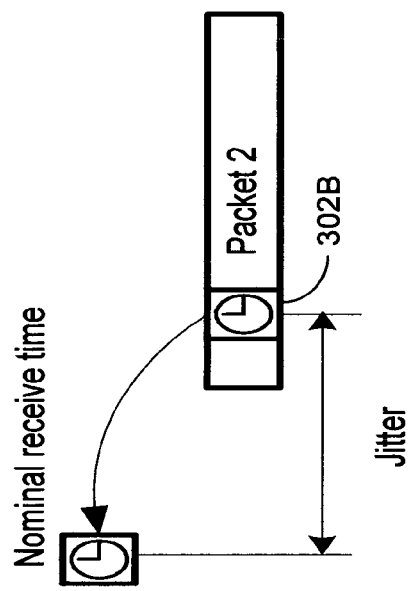
Figure 3A:
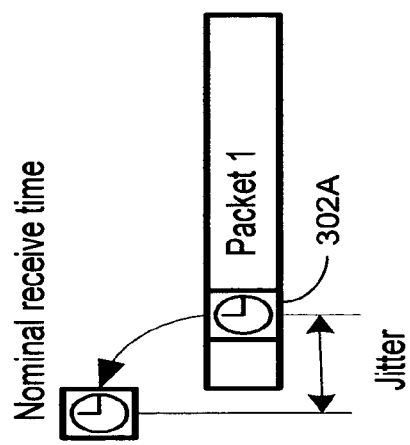

FIGS. 3A, 3B, and 3C are exemplary diagrams illustrating the impact of variation in network delay from packet to packet. Each of FIGS. 3A, 3B, and 3C, illustrate a receive packet, packet 1, packet 2, and packet 3, respectively. Each of packets 1, 2, and 3 includes a timestamp 302A, 302B, and 302C in the RTP header. The timestamps represent a nominal time when receive packets 1, 2, and 3 should have been received, not the actual arrival time. The actual RTP packet arrival time varies from packet to packet due to bursty traffic and delays in the network. However, if the received packet is accurately timestamped at the moment it is received, then the difference between local and RTP timestamps will eventually show the difference of the delivery time, or the packet jitter. As shown in FIGS. 3A, 3B, and 3C, the packet jitter is approximately the same for packets 1 and 3, but much larger for packet 2.

It is important to accurately timestamp the transmission and reception of RTP packets for synchronization purposes. However, in a traditional PC architecture, this may be a difficult task if a software-only implementation is used. When a packet for transmission is received, it is buffered in a network adapter and transferred to main memory when the memory bus becomes available. The network adapter then calls an interrupt, and in 5-100 µseconds the interrupt handler may obtain control. Even if the interrupt handler manages to read an accurate and high resolution clock timestamp, the latencies described above may introduce substantial time errors. Since broadcast quality MPEG streams require the accuracy of clock synchronization to be approximately 30 ppm, such accuracy cannot be achieved in a PC system.

Embodiments of the present invention are directed to integrating a dedicated accurate timestamp circuit in network adapters for streaming media applications. The timestamp network adapters re-stamp (i.e., replace) the RTP timestamp with a new and accurate sample of a local clock generator (timestamp) immediately when the RTP packet leaves the transmitter and generate a local timestamp at the receiver for comparison with the external timestamp when the external timestamp is retrieved from the received RTP packet. Externally timestamping the packet when it leaves the transmitter removes many of the delays that the packet experiences while waiting to be transmitted.

The timestamping in network adapters may be implemented in hardware, software, or a combination thereof. Traditional network adapters usually include a MAC (media access controller) and a PHY (physical) layer. In one embodiment of the invention, the network adapters may reside close to the MAC-PHY interface. In another embodiment, the network adapters may reside within the MAC. In yet another embodiment, the network adapters may reside within the PHY layer. In other embodiments, the network adapters may be add-in modules on a media independent interface (MII).

Figure 4:
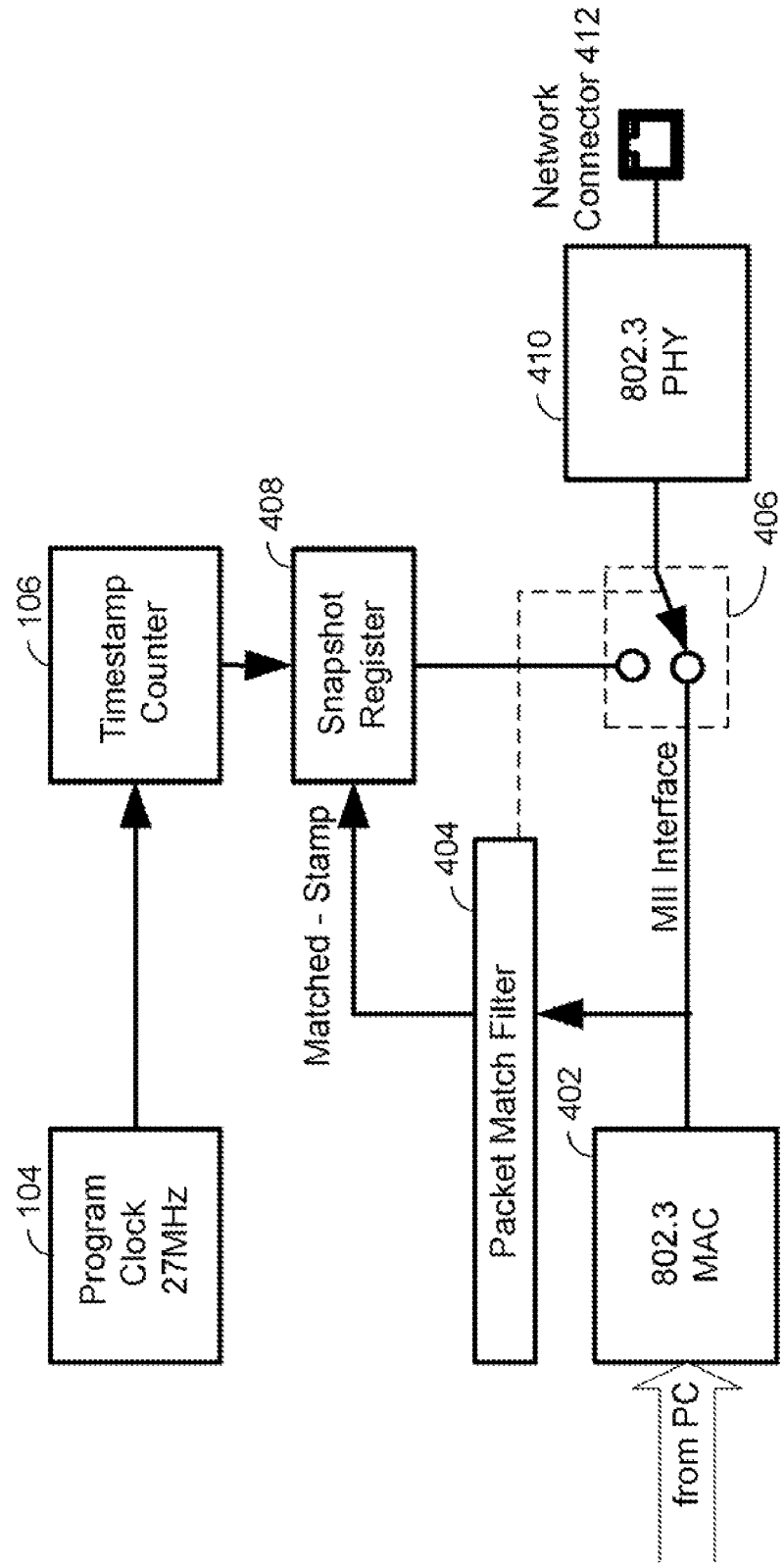
FIG. 4 is an exemplary block diagram illustrating a transmitter of a network adapter for re-stamping (i.e., updating) timestamps on the transmitter side according to an embodiment of the present invention.

FIG. 4 is an exemplary block diagram illustrating a transmitter 400 of a network adapter for re-stamping (i.e., updating) timestamps on the transmitter side according to an embodiment of the present invention. Transmitter 400 comprises a media access controller (MAC) 402, a packet match filter 404, a data switch 406, a snapshot register 408, transmit timestamp counter 106, program clock 104, a physical (PHY) layer 410, and a network connector 412. MAC 402 is coupled to data switch 406 via a MII (media independent interface) interface and packet match filter 404. Packet match filter 404 is coupled to snapshot register 408. Snapshot register 408 is coupled to data switch 406 and transmit timestamp counter 106. Transmit timestamp counter 106 is coupled to program clock 104. PHY layer 410 is coupled to data switch 406 and network connector 412.

Media access controller (MAC) 402 specifies how information is formatted for transmission as well as the way in which a network device gains access to, or control of, a network for transmission. Thus, MAC 402 is crucial to getting information from one place to another safely and reliably.

Packet match filter 404 is a programmable filter. Packet match filter 404 includes a memory or register buffer (not shown). The memory or register buffer stores two strings (i.e., bit patterns) of data: a match string and a mask string. Both the match string and the mask string are comprised of a plurality of bytes. The match string represents a string of bytes that match a pre-determined packet header protocol, such as, but not limited to, a RTP packet header protocol, such as the RTP packet header shown in FIG. 2. Note that the RTP packet header shown in FIG. 2 includes IP header 202, UDP header 204, and RTP header 206. The mask string, equal in length to the match string, is used to indicate which bits in the match string are to be compared with the bits of a packet being transmitted over a network. For example, corresponding bits in the packet being transmitted over the network and the match string are compared if the value of the corresponding mask string bit is set, and corresponding bits in the packet being transmitted over the network and the match string are not compared if the value of the corresponding mask string bit is not set. Thus, a match string having 16 bits (bits 0-15) will only compare bits 0-4 and 7 if an exemplary mask string is 1111100100000000. The length of both the match string and the mask string should be long enough to include at least all bits in the packet being transmitted up to, but not including, a timestamp field, such as the timestamp field in an RTP packet or any other packet protocol that may be used that contains a timestamp field in the header of the packet. Thus, embodiments of the present invention are not limited to RTP protocols, but may include other protocols for audio and video data that include a timestamp field.

Packet match filter 404 compares a packet being transmitted via MAC 402 with the pre-determined packet header protocol to determine if the packet is the same protocol as the pre-determined packet header protocol. The comparison is done up to, but not including, the location of the timestamp field of the packet. If a match is found, packet match filter 404 enables a new timestamp to be entered into the packet being transmitted.

PHY layer 410 provides the hardware means of sending and receiving data on a physical media, including cables, cards and physical aspects. PHY layer 410 conveys the packet to the network via network connector 412.

Data switch 406 selects one of two data paths. The first data path connects PHY layer 412 with MAC 402 to allow a packet retrieved from a PC, or other device capable of generating audio and video data, to be transmitted over the network. The second data path connects PHY layer 412 with snapshot register 408 to enable the insertion of a new timestamp into the packet being transmitted when the match bits of packet match filter 404 match the bits of the packet being transmitted based on the mask string. Data switch 406 is controlled by packet match filter 404.

Snapshot register 408 is a temporary memory device used to receive, hold, and transfer a snapshot of timestamp counter 106 when a match is indicated by packet match filter 404. The value of timestamp counter 106 at the instant the match is indicated is the new timestamp value that is inserted into the packet in real-time during transmission.

A timebase clock generator (not shown) is synchronized with program clock 104. In the case of an MPEG transport over RTP, program clock 104 is usually running at 27 MHz. In other embodiments in which other transport streams are used, program clock 104 may run at a different frequency. The clock ticks from program clock 104 are counted by transmit timestamp counter 106. In one embodiment, transmit timestamp counter 106 may be a 32-bit binary counter. In other embodiments, transmit timestamp counter 106 may be a counter having more than or less than 32-bits, such as, for example, 16-bits or 64-bits.

When a PC, or other device capable of transmitting audio and video data, such as, but not limited to, a laptop computer, a workstation, a personal digital assistant, etc., is ready to transmit a packet, the PC will place the packet in a network stack and/or adapter. MAC 402 will then retrieve the packet from the PC and send the packet to PHY 410 over a MII (media independent interface) interface via data switch 406. As the packet is being transmitted over the MII interface, match filter 404 is comparing the match string to the bits of the packet being transmitted based on the mask string. If the packet bits and the match bits indicate a matching pattern, packet match filter 404 will indicate a match to snapshot register 408 and enable the path from PHY layer 410 to snapshot register 408 to be activated via data switch 406.

As previously indicated, once packet match filter 404 has determined a pattern match, the packet being transmitted is ready to transmit the timestamp. Since the timestamp included in the packet may have associated with it unknown delays due to bursty traffic, retransmissions, and buffering, this timestamp may no longer be correct. Thus, when snapshot register 408 is triggered by packet match filter 404 that a match has occurred, snapshot register 408 takes a snapshot of transmitter timestamp counter 106 and stores the value in snapshot register 408. At the same instance, the path between PHY 410 and snapshot register 408 is connected and the new, more accurate, timestamp generated by transmit timestamp counter 106 via program clock 104, is inserted into the timestamp field of the packet being transmitted in real-time to replace the original timestamp. Once the timestamp is inserted, data switch 406 immediately returns to the position that connects PHY layer 410 with MAC 402 via the MII interface to enable the remaining portion of the packet to be transmitted. Since the replacement of the timestamp is performed in real-time while the packet is being transmitted over the network, accurate timing indicating when the packet was transmitted is now included in the packet. Although the original timestamp is replaced, all other fields of the packet remain the same.

The error control in data networks is usually based on cyclic redundancy check (CRC) sums which check the integrity of the data that is transmitted over the network. If the CRC is generated in the PHY layer, a valid CRC will cover the new timestamp. In embodiments of the invention where CRC is calculated within the MAC, a new timestamp will corrupt the CRC. Thus, the CRC needs to be recalculated and inserted into the CRC field to provide a valid CRC. The details of CRC generation are well known to those skilled in the relevant art(s).

Figure 5:
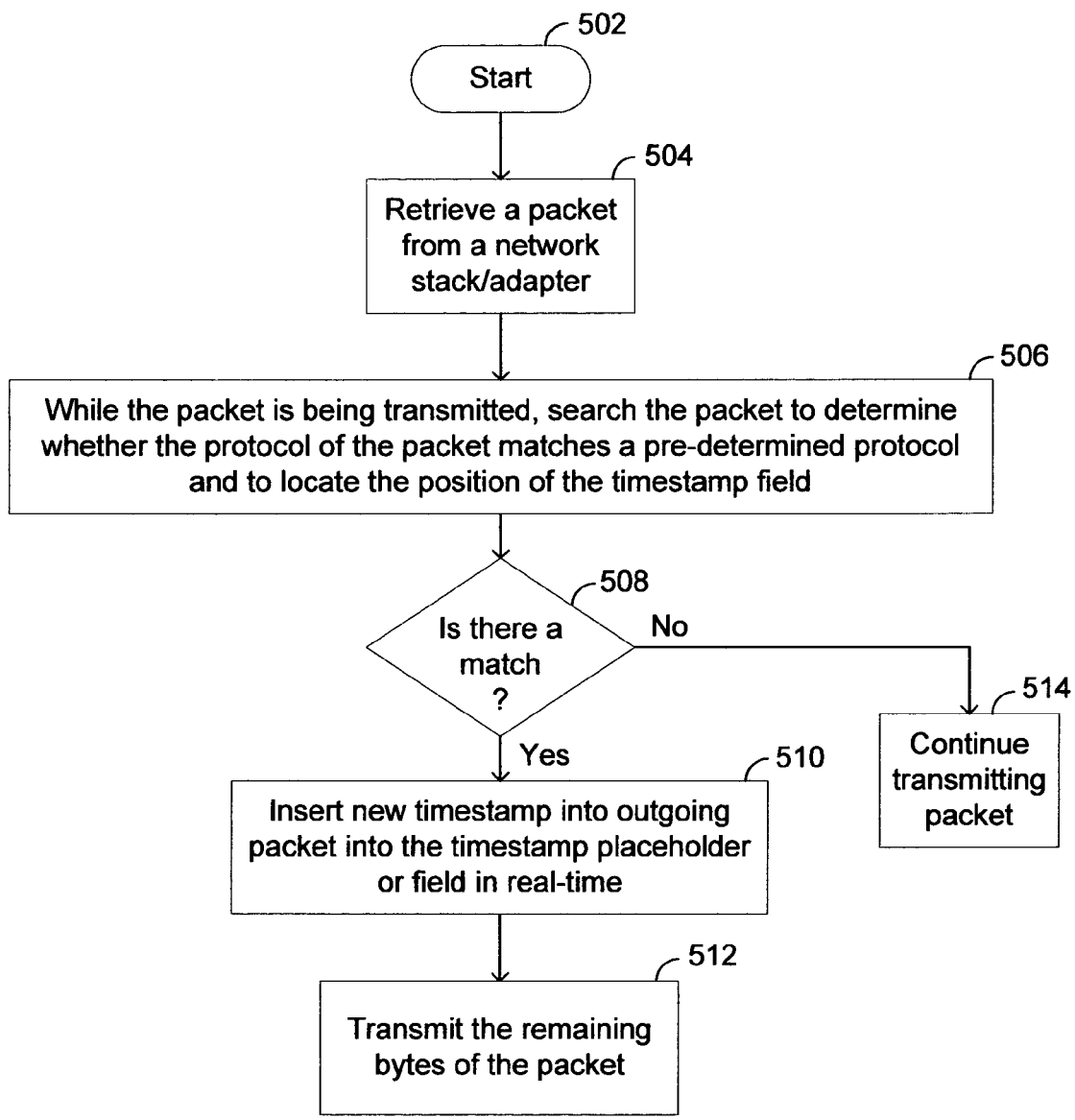
FIG. 5 is an exemplary flow diagram describing a method for updating timestamps on a transmitter side of a network adapter according to an embodiment of the present invention.

FIG. 5 is an exemplary flow diagram 500 describing a method for updating timestamps on the transmitter side of a network adapter according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins with block 502, where the process immediately proceeds to block 504.

In block 504, a packet is retrieved from a network stack and/or adapter for transmission over a network. The retrieved packet includes a placeholder or field for a timestamp. The timestamp field includes a timestamp, usually inserted using software, that may no longer be accurate due to delays caused by bursty traffic, retransmissions, and buffering.

In block 506, as the packet is being transmitted, the packet is searched to determine the protocol of the packet and to locate the position of the timestamp placeholder or field. This is accomplished by comparing the match string with the packet based on the mask string, as described above with reference to FIG. 4.

In decision block 508, it is determined whether the packet is a match to a pre-determined protocol, such as, for example, a RTP packet. If it is determined that the packet is a match and thus, that the location of the timestamp field has been located, control then passes to block 510.

In block 510, a new timestamp is inserted into the packet in place of the original timestamp in real-time. The new timestamp is indicative of the time at which the packet is actually being transmitted over the network.

In block 512, the remaining bytes of the packet are transmitted across the network after the new timestamp is inserted in the timestamp field.

Returning to decision block 508, if it is determined that the packet does not match, then control passes to block 514, where the packet (including the original timestamp) continues to be transmitted across the network. Thus, the packets that are not carrying audio/video traffic of interest are left unmodified.

Figure 6:
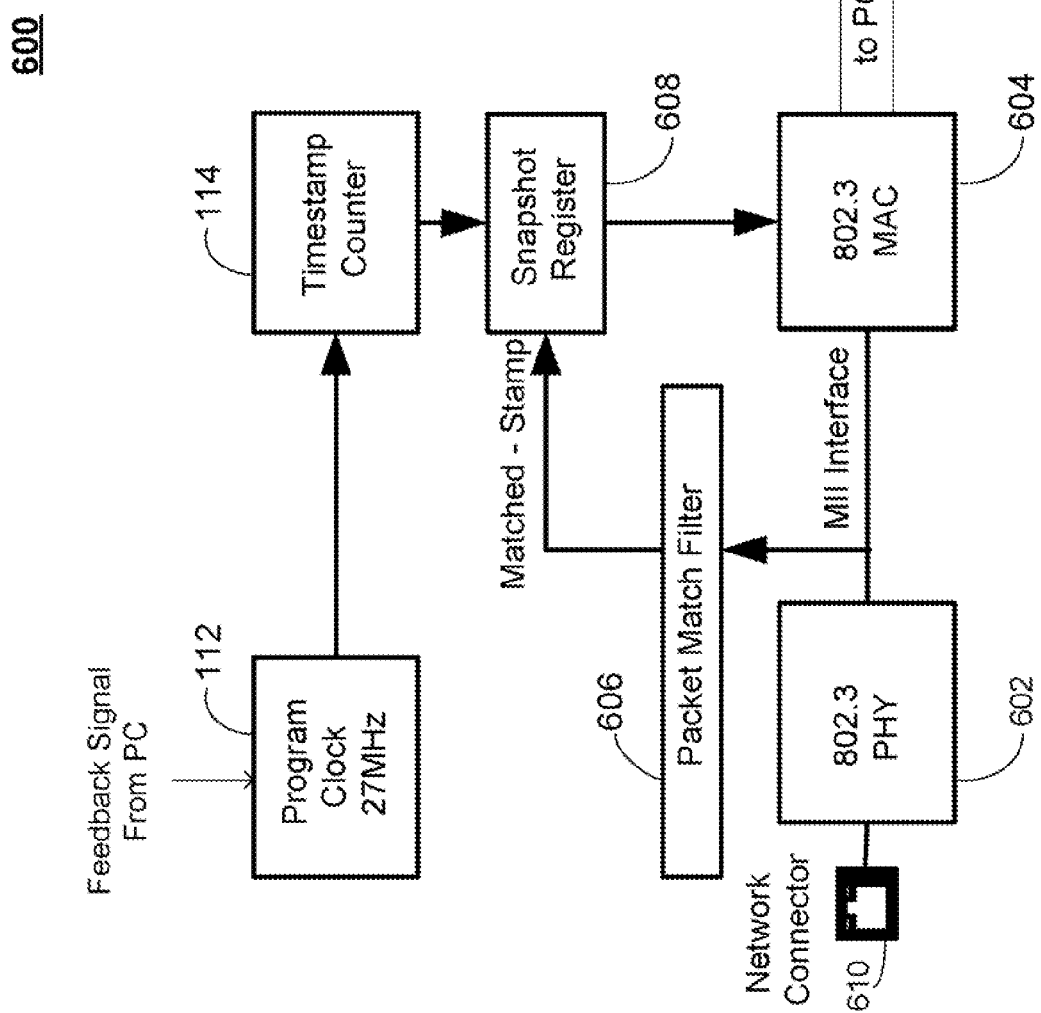
FIG. 6 is an exemplary block diagram illustrating a receiver of a network adapter for accurately timestamping received packets on the receiver side according to an embodiment of the present invention.

FIG. 6 is an exemplary block diagram illustrating a receiver 600 of a network adapter for generating accurate timestamps on the receiver side according to an embodiment of the present invention. Receiver 600 comprises a PHY layer 602, a MAC 604, a packet match filter 606, a snapshot register 608, timestamp counter 114, and program (i.e., local) clock 112. PHY layer 602 is coupled to MAC 604 via a MII interface. PHY layer 602 is also coupled to packet match filter 606. Packet match filter 606 is coupled to snapshot register 608. Snapshot register 608 is coupled to MAC 604 and timestamp counter 114. Timestamp counter 114 is coupled to local program clock 112.

Many of the same components found in transmitter 400 are also found in receiver 600. The operation of these components is also similar with a few exceptions. Again, a clock generator (not shown) is synchronized with local program clock 112. In the case of an MPEG transport over RTP, local program clock 112 is running at 27 MHz. In other embodiments in which other transport streams are used, local program clock 112 may run at a different frequency. The clock ticks from local program clock 112 are counted by receiver timestamp counter 114. In one embodiment, receiver timestamp counter 114 may be a 32-bit binary counter. In other embodiments, receiver timestamp counter 114 may be a counter having more than or less than 32-bits, such as, for example, 16-bits or 64-bits.

A packet received by receiver 600 enters PHY layer 602 via a network connector 610. PHY layer 602 sends the received packet to MAC 604 via a MII interface for transmission to a PC or other device capable of decoding audio and video signals, such as, but not limited to, a laptop computer, a workstation, a personal digital assistant, etc. As the received packet is being sent over the MII interface, match filter 606 is comparing a match string to the bits of the received packet based on a mask string. As previously stated, the match string represents a string of bytes that match a pre-determined packet header protocol, such as, but not limited to, an RTP packet header protocol. Although embodiments of the present invention are described using a pre-determined packet header protocol as the matching identification criteria, other identification criteria may also be used. The identification criteria may include, but is not limited to, MAC addresses, data types, source and destination addresses, etc.

The mask string is used to indicate which bits in the match string are to be compared with the bits of the received packet. Both the match string and the mask string of packet match filter 606 are identical to the match string and the mask string of packet match filter 404. If the received packet bits and the match bits indicate a matching pattern, the location of the timestamp field is reached. At this instance, packet match filter 606 will indicate a match to snapshot register 608. Snapshot register will, in real-time, take a snapshot of receiver timestamp counter 114 and store the value of receiver timestamp counter 114 in snapshot register 608. The value stored in snapshot register 608 is referred to as the local timestamp. In other words, the value retrieved from receiver timestamp counter 114 upon the triggering of a match is the local timestamp. The local timestamp is communicated to the frequency control loop, which may be implemented in software, hardware, or a combination thereof. In one embodiment, the local timestamp is appended to the end of the received packet as the received packet is being sent to the PC via MAC 604 for generating the difference between the local timestamp and the received timestamp, filtering, and adjusting the clock frequency in software. In another embodiment, the local timestamp is sent to the PC via MAC 604 and stored in a register. The difference (or error) between the local timestamp and the received timestamp is then determined, and the difference (or error) signal is used to adjust the frequency of local program clock 112.

Figure 7:
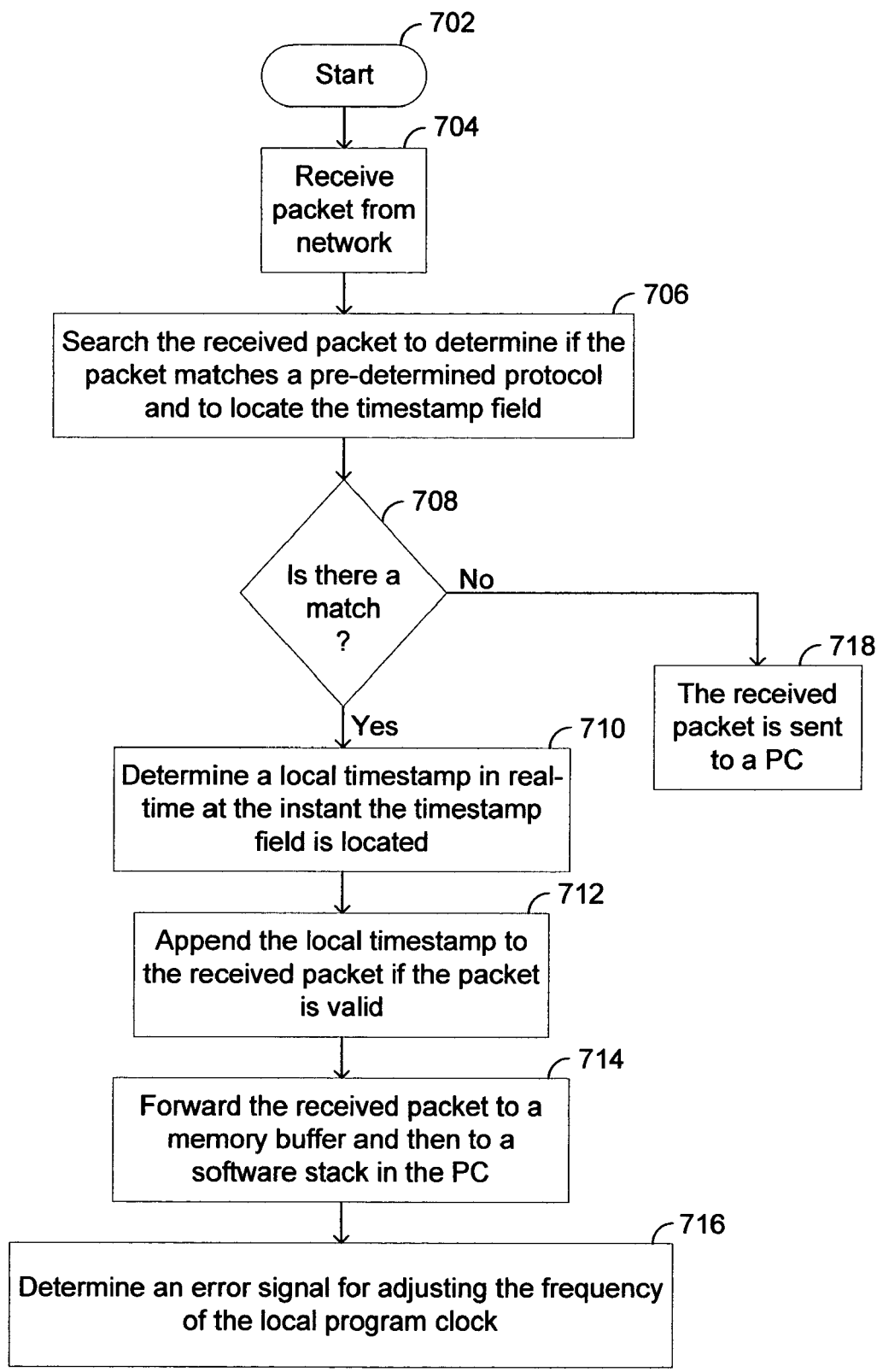
FIG. 7 is an exemplary flow diagram describing a method for accurately timestamping received packets on the receiver side according to an embodiment of the present invention.

FIG. 7 is an exemplary flow diagram illustrating a method for generating accurate timestamps on a receiver side of a network adapter according to an embodiment of the present invention. The invention is not limited to the embodiment described herein with respect to flow diagram 700. Rather, it will be apparent to persons skilled in the relevant art(s) after reading the teachings provided herein that other functional flow diagrams are within the scope of the invention. The process begins with block 702, where the process immediately proceeds to block 704.

In block 704, a packet is received from a network. The received packet is then searched to determine whether the received packet is a match to a pre-determined protocol as well as to locate the timestamp field within the received packet (block 706). As previously indicated, identification criteria other than a pre-determined protocol may also be used. The identification criteria may include, but not limited to, MAC addresses, data type, source and destination addresses, etc.

In decision block 708, it is determined whether the received packet is a match with the pre-determined protocol. If it is determined that the received packet is a match with the pre-determined protocol, the packet has reached the location of the timestamp field. Control then passes to block 710.

In block 710, at the instant the timestamp field is located in the received packet, a local timestamp is determined. The local timestamp is determined by reading a timestamp counter associated with a local clock. The local clock is synchronized to a clock generator.

In block 712, the local timestamp is sent to the MAC, which temporarily stores the local timestamp until the complete packet is received and the CRC is verified. If the CRC is valid, the local timestamp is appended to the end of the received packet. Note that if the CRC is not valid, the data is invalid, and the packet is not used. After the packet is received by the PC, the received packet, along with the appended local timestamp, is stored in memory and/or a software stack (block 714). In another embodiment, instead of appending the local timestamp to the received packet, the local timestamp may be sent to the PC separately and stored in memory and/or the software stack. Storing the data in the suggested format allows for backward software compatibility with non-timestamp enabled network controllers.

In block 716, an error signal between the local timestamp and the received timestamp (i.e., the timestamp within the received packet) is used to adjust the frequency of the local program clock.

Returning to decision block 708, if it is determined that the received packet is not a match with the pre-determined protocol, the process proceeds to block 718, where the received packet continues to be sent to the PC.

Figure 8:
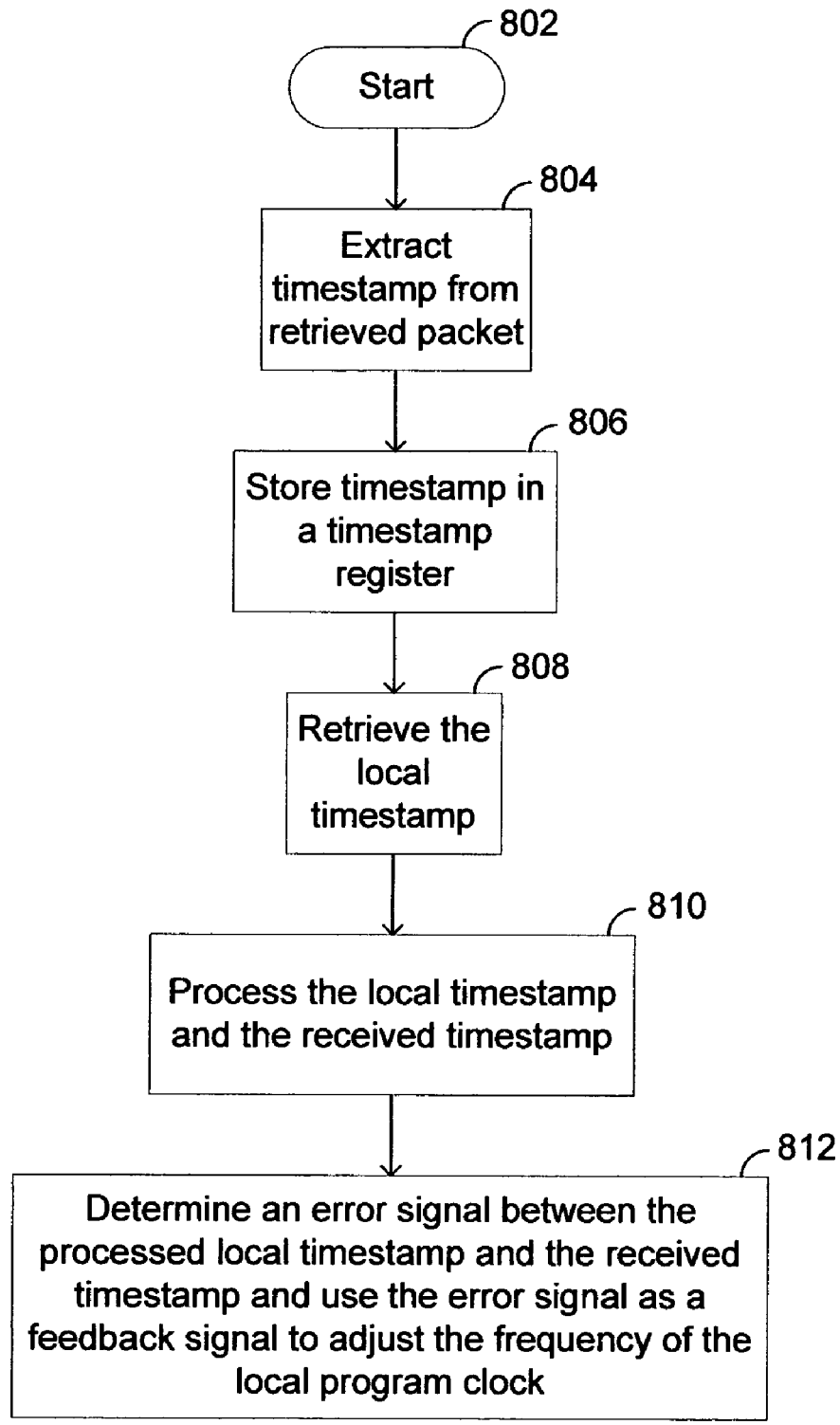
FIG. 8 is an exemplary flow diagram describing a method for generating an error signal for adjusting the frequency of a local clock according to an embodiment of the present invention.

FIG. 8 is an exemplary flow diagram describing a method for determining an adjustment value for adjusting the frequency of a local program clock according to an embodiment of the present invention. The invention is not limited to the embodiment described herein with respect to flow diagram 800. Rather, it will be apparent to persons skilled in the relevant art(s) after reading the teachings provided herein that other functional flow diagrams are within the scope of the invention. The process begins with block 802, where the process immediately proceeds to block 804.

In block 804, the received timestamp is extracted from the received packet stored in memory and/or the software stack. The received timestamp is stored in a timestamp register in block 806.

In block 808, the local timestamp is also retrieved from memory. If the local timestamp is appended to the received packet, the local timestamp may also be extracted from the received packet stored in memory and/or the software stack and placed in a local timestamp register.

In block 810, the software stack processes both the received RTP timestamp and the local timestamp. In one embodiment, low-pass filtering is used to obtain nominal temporal positions of the RTP packet, and then, if necessary, jitter filtering or timing correction is done.

In block 812, an error signal between the nominal and actual position of the timestamps are determined by subtracting the nominal position from the actual position. The error signal is then used as feedback to the local program clock to adjust the frequency of the local program clock.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method of end-to-end clock recovery for media streaming, comprising:
   receiving a data packet at a media access controller (MAC) of a network adapter, the data packet being a part of a streaming media application;
   inspecting the data packet using a packet match filter to determine a protocol type of the data packet and a location of a timestamp field in the data packet containing an original timestamp; and
   if the data packet matches a pre-determined protocol type:
      generating a new transmit timestamp for the data packet in real-time, the new transmit timestamp being generated at the time of transmission of the data packet by the packet match filter triggering a snap shot register to take a snapshot of a transmitter timestamp counter;
      switching a connection of a physical layer (PHY) from the MAC to the snapshot register using a data switch and inserting the new transmit timestamp from the snapshot register into the timestamp field of the data packet in place of the original timestamp for the data packet;
      switching the connection of the PHY back to the MAC to enable a remaining portion of the data packet; and
      transmitting the data packet over a network to a receiver.

2. The method of claim 1, wherein the receiver, upon receiving the data packet, inspects the received data packet to determine whether the received data packet matches an identification criterion, wherein if the received data packet matches the identification criterion, the method further comprises:
   generating a local timestamp by taking a sample of a local clock within the receiver at a time instance of receiving the data packet, wherein the time instance is associated with an arrival time of the received data packet; and
   processing the local timestamp and the new transmit timestamp in the received data packet to determine an error signal, wherein the error signal is used to adjust the local clock within the receiver.

3. The method of claim 2, wherein the identification criterion comprises at least one of the pre-determined protocol type, a MAC address, a data type, a source address, and a destination address.

4. The method of claim 2, wherein the local timestamp is sent along with the received data packet to a receiver application prior to processing the local timestamp and the new transmit timestamp.

5. The method of claim 2, wherein if the received data packet does not match the identification criterion, then forwarding the received data packet to an application without further processing.

6. The method of claim 1, wherein the pre-determined protocol type comprises a Real-Time Protocol.

7. The method of claim 1, wherein the network comprises a data packet-based network.

8. The method of claim 1, wherein the network comprises one of a wired and wireless network.

9. The method of claim 1, wherein inspecting the data packet to determine a protocol type of the data packet and a location of the timestamp field in the data packet further comprises the packet match filter comparing a match string with corresponding bits in the data packet based on a mask string, wherein the match string represents a string of bits that match the predetermined protocol type and the mask string indicates the bits in the match string that are to be compared with the corresponding bits of the data packet.

10. A method of clock recovery for media streaming comprising:
    receiving a data packet from a transmitter over a network at a physical layer (PHY) of a network adapter, the PHY being coupled with a media access controller (MAC);
    searching the received data packet using a packet match filter to determine if the received data packet matches a pre-determined identification criterion and to locate a timestamp field containing a transmit timestamp within the received data packet as the received data packet is sent to a media device; and
    if the received data packet matches the pre-determined identification criterion, then:
      generating a local timestamp in real-time indicative of the time instance in which the received data packet arrived by the packet match filter triggering a snapshot register to take a snapshot of a receiver timestamp counter;
      sending the received data packet from the PHY to the MAC;
      appending the local timestamp from the snapshot register to the received data packet utilizing the MAC; and
      determining an error signal for adjusting a frequency of a local clock using the local timestamp and the transmit timestamp extracted from the received data packet, the transmit timestamp extracted from the received data packet being a timestamp generated at the time of transmission of the data packet that was substituted for an original data packet timestamp.

11. The method of claim 10, wherein the transmit timestamp extracted from the received data packet is an updated timestamp, the updated timestamp indicating a time when the data packet was transmitted.

12. The method of claim 10, wherein identification criterion comprises at least one of a protocol type, a MAC address, a data type, a source address, and a destination address.

13. The method of claim 10, wherein the media device comprises a digital device capable of processing digital media content.

14. The method of claim 10, wherein the media device comprises at least one of a personal computer, a workstation, a laptop, and a personal digital assistant.

15. The method of claim 10, wherein searching the received data packet to determine if the received data packet matches a pre-determined identification criterion and to locate a timestamp field within the received data packet further comprises the packet match filter comparing a match string with corresponding bits in the received data packet based on a mask string, wherein the match string represents a string of bytes that match the predetermined identification criterion and the mask string indicates the bits in the match string that are to be compared with the corresponding bits of the received data packet.

16. The method of claim 10, further comprising:
if the received data packet is a mismatch to the pre-determined identification criterion, forwarding the received data packet to the media device without further processing within the receiver.

17. The method of claim 10, wherein the pre-determined identification criterion comprises a pre-determined protocol type for a Real-Time Protocol.

18. The method of claim 10, wherein determining an error signal for adjusting a frequency of a local clock using the local timestamp and a transmit timestamp extracted from the received data packet further comprises:
processing the local timestamp and the transmit timestamp extracted from the received data packet;
determining an error signal between the processed local timestamp and the processed transmit timestamp extracted from the received data packet; and
using the error signal as a feedback signal to adjust the frequency of the local clock in the receiver to synchronize the local clock with a clock in the transmitter.

19. The method of claim 18, wherein processing the local timestamp and the transmit timestamp extracted from the received data packet comprises one or more of low-pass filtering, jitter filtering, and timing correction techniques.

20. An article comprising:
a computer-readable medium having a plurality of computer-readable instructions, wherein when the instructions are executed by a processor, the instructions providing for:
receiving a data packet at a media access controller (MAC) of a network adapter, the data packet being a part of a streaming media application;
inspecting a data packet using a packet match filter to determine a protocol type of the data packet and a location of a timestamp field in the data packet containing an original timestamp; and
if the data packet matches a pre-determined protocol type, then:
generating a new transmit timestamp for the data packet in real-time, the new transmit timestamp defining the time of transmission of the data packet by the packet match filter triggering a snapshot register to take a snapshot of a transmitter timestamp counter;
switching a connection of a physical layer (PHY) from the MAC to the snapshot register using a data switch and inserting the new transmit time stamp from the snapshot register into the timestamp field of the data packet in place of an original timestamp for the data packet;
switching the connection of the PHY back to the MAC to enable a remaining portion of the data packet; and
transmitting the data packet over a network to a receiver.

21. The article of claim 20, wherein the receiver, upon receiving the packet, inspects the received data packet to determine whether the received data packet matches an identification criterion, wherein if the received data packet matches the identification criterion, the article further comprises computer-readable instructions for:

taking a sample of a local clock within the receiver at a time instance of receiving the data packet, wherein the sample of the local clock represents a local timestamp and wherein the time instance is associated with an arrival time of the received data packet; and
processing the local timestamp and the new transmit timestamp in the received data packet to determine an error signal, wherein the error signal is used to adjust the local clock within the receiver.

22. The article of claim 21, wherein the identification criterion comprises at least one of the pre-determined protocol type, a MAC address, a data type, a source address, and a destination address.

23. The article of claim 21, wherein the local timestamp is sent along with the received data packet to a receiver application prior to processing the local timestamp and the new transmit timestamp.

24. The article of claim 21, wherein if the received data packet is a mismatch with the identification criterion, forwarding the mismatched received data packet to an application without further processing.

25. The article of claim 20, wherein the pre-determined protocol type comprises a Real-Time Protocol.

26. The article of claim 20, wherein the network comprises a packet-based network.

27. The article of claim 20, wherein the network comprises one of a wired and wireless network.

28. The article of claim 20, wherein instructions for inspecting the data packet to determine a protocol type of the data packet and a location of the timestamp field in the data packet further comprises instructions for the packet match filter comparing a match string with corresponding bits in the data packet based on a mask string, wherein the match string represents a string of bytes that match the predetermined protocol type and the mask string indicates the bits in the match string that are to be compared with the corresponding bits of the data packet.

29. An article comprising a computer-readable medium having a plurality of computer-readable instructions, wherein when the instructions are executed by a processor, the instructions providing for:
receiving a data packet from a transmitter over a network at a physical layer (PHY) of a network adapter, the PHY being coupled with a media access controller (MAC);
searching the received data packet using a packet match filter to determine if the received data packet matches a pre-determined identification criterion and to locate a timestamp field containing a transmit timestamp within the received data packet as the received data packet is sent to a media device;
if the received data packet matches the pre-determined identification criterion:
generating a local timestamp in real-time indicative of the time instance in which the received data packet arrived by the packet match filter triggering a snapshot register to take a snapshot of a receiver timestamp counter;
sending the received data packet from the PHY to the MAC;
appending the local timestamp from the snapshot register to the received data packet utilizing the MAC; and
determining an error signal for adjusting a frequency of a local clock using the local timestamp and the transmit timestamp extracted from the received data packet, the transmit timestamp extracted from the received data packet being a timestamp generated at the time of transmission of the data packet that was substituted for an original data packet timestamp.

30. The article of claim 29, wherein the transmit timestamp of the data packet received from the transmitter comprises an updated timestamp, the updated timestamp indicating a time when the data packet was transmitted.

31. The article of claim 29, wherein identification criterion comprises at least one of a protocol type, a MAC address, a data type, a source address, and a destination address.

32. The article of claim 29, wherein the media device comprises a digital device capable of processing digital media content.

33. The article of claim 29, wherein the media device comprises at least one of a personal computer, a workstation, a laptop, and a personal digital assistant.

34. The article of claim 29, wherein the instructions for searching the received data packet to determine if the received data packet matches a pre-determined identification criterion and to locate a timestamp field within the received data packet further comprises instructions for the packet filter comparing a match string with corresponding bits in the received data packet based on a mask string, wherein the match string represents a string of bytes that match the predetermined identification criterion and the mask string indicates the bits in the match string that are to be compared with the corresponding bits of the received data packet.

35. The article of claim 29, wherein if the received data packet is a mismatch to the pre-determined identification criterion, further comprising instructions for forwarding the received data packet to the media device without further processing.

36. The article of claim 29, wherein the pre-determined identification criterion comprises a pre-determined protocol type for a Real-Time Protocol.

37. The article of claim 29, wherein the instructions for determining an error signal for adjusting a frequency of a local clock using the local timestamp and the transmit timestamp extracted from the received data packet further comprise instructions for:
processing the local timestamp and the transmit timestamp extracted from the received data packet;
determining an error signal between the processed local timestamp and the processed transmit timestamp extracted from the received data packet; and
using the error signal as a feedback signal to adjust the frequency of the local clock in the receiver to synchronize the local clock with a clock in the transmitter.

38. The article of claim 37, wherein the instructions for processing the local timestamp and the transmit timestamp extracted from the received data packet comprises instructions for one or more of low-pass filtering, jitter filtering, and timing correction techniques.

39. A network adapter for clock recovery comprising:
a transmitter to transmit data packets over a network, the transmitter including a media access controller (MAC) to receive data packets, the MAC connected with a physical layer (PHY) via a digital switch, the transmitter comprising a transmit match filter coupled to a transmit timestamp generator and insertion circuit, the transmit timestamp generator and insertion circuit including a transmit snapshot register and a transmit timestamp counter, the transmit match filter used to determine whether each data packet being transmitted matches a pre-determined protocol and to locate a timestamp field contain an original timestamp within each of the data packets, the timestamp generator and insertion circuit used to generate a transmit timestamp for each data packet when it is determined that the data packet matches the pre-determined protocol and to insert the transmit timestamp for each data packet into the timestamp field for the data packet in real-time as the data packets are being transmitted over the network;
wherein generating a transmit timestamp for each data packet includes the transmit match filter triggering the snapshot register to take a snapshot of the transmitter timestamp counter; and
wherein inserting the transmit timestamp for each data packet into the timestamp field for the data packet in real-time includes the digital switch switching the PHY from the MAC to the snapshot register and inserting the new transmit timestamp from the snapshot register into the timestamp field of the data packet in place of the original timestamp for the data packet, switching the connection of the PHY back to the MAC to enable a remaining portion of the data packet.

40. The network adapter of claim 39, further comprising:
a receiver to receive the data packets transmitted over the network, the receiver including a physical layer (PHY) to receive the data packets, the PHY being coupled with a media access controller (MAC), the receiver comprising a receiver match filter coupled to a local timestamp generator circuit, the local timestamp circuit including a receiver snapshot register and a receiver timestamp counter the receiver match filter used to determine whether each received data packet matches the pre-determined protocol and to locate the timestamp field within each of the received data packets, the local timestamp generator circuit used to generate a local timestamp in real-time for each matching data packet when the timestamp field for each such data packet is located;
wherein generating a local timestamp for each received data packet includes the transmit match filter triggering the snapshot register to take a snapshot of the transmitter timestamp counter.

41. The network adapter of claim 40, wherein the local timestamp and the transmit timestamp are processed to determine an error signal, wherein the error signal is used to correct a local clock within the local timestamp generator circuit to synchronize the local clock with a transmit program clock within the transmit timestamp generator and insertion circuit.

42. The network adapter of claim 40, wherein the receiver timestamp generator comprises a local clock coupled to the receiver timestamp counter, and wherein an indication from the receiver match filter that a match has occurred enables the receiver snapshot register to obtain a snapshot of the receiver timestamp counter as the local timestamp, wherein the snapshot of the receiver timestamp counter is based on a time of the local clock.

43. The network adapter of claim 39, wherein the transmit timestamp generator and insertion circuit comprises a transmit program clock coupled to a transmit timestamp counter; and wherein an indication from the transmit match filter that a match has occurred enables the transmit snapshot register to obtain a snapshot of the timestamp counter as the transmit timestamp and enables the switch to connect the transmit snapshot register to an output path to allow the transmit timestamp to be inserted in the timestamp field as the data packets are being transmitted over the network.

44. The network adapter of claim 43, wherein the snapshot of the transmit timestamp counter is based on a time of the transmit program clock.

\* \* \* \* \*